(12) United States Patent
Xu et al.

(10) Patent No.: US 10,961,651 B2
(45) Date of Patent: Mar. 30, 2021

(54) INTERNET OF THINGS WASHING MACHINE CONTROL METHOD, CONTROL SYSTEM, AND WASHING MACHINE

(71) Applicant: Qingdao Haier Drum Washing Machine Co., Ltd., Shandong (CN)

(72) Inventors: Sheng Xu, Shandong (CN); Zhenxing Huang, Shandong (CN); Yan Li, Shandong (CN); Junming Yin, Shandong (CN); Mingyao Liu, Shandong (CN); Gaoxian Zhang, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 336 days.

(21) Appl. No.: 15/771,521

(22) PCT Filed: Oct. 27, 2016

(86) PCT No.: PCT/CN2016/103555
§ 371 (c)(1),
(2) Date: Apr. 27, 2018

(87) PCT Pub. No.: WO2017/071612
PCT Pub. Date: May 4, 2017

(65) Prior Publication Data
US 2019/0024284 A1   Jan. 24, 2019

(30) Foreign Application Priority Data
Oct. 30, 2015   (CN) .......................... 201510728628.8

(51) Int. Cl.
*D06F 33/00* (2020.01)
*D06F 33/30* (2020.01)
(Continued)

(52) U.S. Cl.
CPC .............. *D06F 33/00* (2013.01); *D06F 33/30* (2020.02); *D06F 33/44* (2020.02); *D06F 33/52* (2020.02);
(Continued)

(58) Field of Classification Search
CPC .......... D06F 33/00; D06F 33/30; D06F 33/44; D06F 33/52; D06F 33/56; D06F 33/70;
(Continued)

(56) References Cited

U.S. PATENT DOCUMENTS

| 8,438,879 | B2 * | 5/2013 | Gokceimam | ........... D06F 34/28 68/12.23 |
| 9,538,311 | B2 * | 1/2017 | Baum | .................. H04L 63/0807 |

(Continued)

FOREIGN PATENT DOCUMENTS

| CN | 1464926 A | 12/2003 |
| CN | 102105633 A | 6/2011 |

(Continued)

OTHER PUBLICATIONS

International Search Report (PCT/ISA/210) dated Feb. 3, 2017, by the Chinese Patent Office as the International Searching Authority for International Application No. PCT/CN2016/103555.
(Continued)

*Primary Examiner* — Jennifer L Norton
(74) *Attorney, Agent, or Firm* — Buchanan Ingersoll & Rooney PC

(57) ABSTRACT

An Internet of Things washing machine control method comprises the steps of, when a power module of the washing machine detects a startup signal, starting up the washing machine, and enabling a communication module to start to connect with the Internet; judging whether the communication module is successfully connected with the Internet, if yes, activating a remote control function and entering the
(Continued)

next step, and if no, directly entering the next step; judging whether the washing machine receives an operating command of running a clothes washing program, if yes, executing the operating command and entering the next step, and if no, directly entering the next step; judging whether to shut down the washing machine, if yes, entering the next step, and if no, returning to the step; sending a shutdown signal to the power module, shutting down the washing machine, and powering off the communication module.

14 Claims, 4 Drawing Sheets

(51) Int. Cl.
| | | |
|---|---|---|
| D06F 33/44 | (2020.01) | |
| D06F 34/06 | (2020.01) | |
| D06F 33/52 | (2020.01) | |
| D06F 33/56 | (2020.01) | |
| D06F 33/70 | (2020.01) | |
| D06F 34/05 | (2020.01) | |
| D06F 34/28 | (2020.01) | |
| G05B 19/042 | (2006.01) | |
| H04L 29/08 | (2006.01) | |
| D06F 103/38 | (2020.01) | |
| D06F 34/08 | (2020.01) | |
| D06F 103/00 | (2020.01) | |
| D06F 105/54 | (2020.01) | |

(52) U.S. Cl.
CPC .............. *D06F 33/56* (2020.02); *D06F 33/70* (2020.02); *D06F 34/05* (2020.02); *D06F 34/06* (2020.02); *D06F 34/28* (2020.02); *G05B 19/0428* (2013.01); *H04L 67/12* (2013.01); *D06F 34/08* (2020.02); *D06F 2103/00* (2020.02); *D06F 2103/38* (2020.02); *D06F 2105/54* (2020.02); *G05B 2219/2633* (2013.01)

(58) Field of Classification Search
CPC .......... D06F 34/05; D06F 34/06; D06F 34/08; D06F 34/28; D06F 2103/00; D06F 2103/38; D06F 2105/54; G05B 19/0428; G05B 2219/2633; H04L 67/12
See application file for complete search history.

(56) References Cited

U.S. PATENT DOCUMENTS

| | | | |
|---|---|---|---|
| 9,671,766 B2* | 6/2017 | Ha | H04L 12/2809 |
| 2002/0095483 A1 | 7/2002 | Lee et al. | |
| 2006/0265084 A1 | 11/2006 | Moon | |
| 2007/0107140 A1 | 5/2007 | Choi et al. | |
| 2008/0105001 A1* | 5/2008 | Jeong | D06F 33/00 68/12.02 |
| 2013/0255327 A1* | 10/2013 | Park | D06F 34/32 68/13 R |
| 2014/0067131 A1* | 3/2014 | Park | D06F 34/28 700/275 |
| 2017/0269563 A1* | 9/2017 | Ha | H04L 12/2809 |
| 2020/0141038 A1* | 5/2020 | Xu | D06F 34/28 |

FOREIGN PATENT DOCUMENTS

| | | |
|---|---|---|
| CN | 103207977 A | 7/2013 |
| CN | 103389717 A | 11/2013 |
| CN | 104060439 A | 9/2014 |
| CN | 104294530 A | 1/2015 |
| GB | 1595495 A | 8/1981 |
| JP | 2004-521712 A | 7/2004 |
| JP | 2014-226235 A | 12/2014 |
| KR | 20030003948 A | 1/2003 |
| WO | 03/004753 A1 | 1/2003 |

OTHER PUBLICATIONS

Written Opinion (PCT/ISA/237) dated Feb. 3, 2017, by the Chinese Patent Office as the International Searching Authority for International Application No. PCT/CN2016/103555.
Supplementary European Search Report dated Oct. 15, 2018 by the European Patent Office in corresponding European Patent Application No. 16859047. (2 pages).
Office Action dated Jan. 31, 2020, by the India Patent Office in corresponding India Patent Application No. 201827018727 and English translation of the Office Action. (7 pages).
Office Action (Notification of Reason for Refusal) dated Aug. 30, 2019, by the Korean Patent Office in corresponding Korean Patent Application No. 10-2018-7015089 and English translation of the Office Action. (20 pages).
Office Action (Notice of Reasons for Refusal) dated Oct. 23, 2019, by the Japanese Patent Office in corresponding Japanese Patent Application No. 2018-521842 and English translation of the Office Action. (6 pages).

* cited by examiner

INTERNET OF THINGS WASHING MACHINE CONTROL METHOD, CONTROL SYSTEM, AND WASHING MACHINE

TECHNICAL FIELD

The disclosure relates to the field of washing machines, and in particular relates to an Internet of Things washing machine control method, a control system and a washing machine.

BACKGROUND

Along with the development of Internet of Things technologies, a remote control technology of a washing machine is also quickly enhanced. Communication between the washing machine and the Internet can be achieved by adding a wireless communication module to the washing machine; and remote control of the washing machine can be achieved by installing an APP (Application) client on intelligent terminal equipment.

At present, a remote control method of the washing machine in the prior art comprises the steps as follows: an electric plug of the washing machine is connected with a power supply, meanwhile a communication module is powered on, the washing machine is in an Internet-connected standby state and waits for being started up by a user via an intelligent terminal. After washing is completed, the user shuts down the washing machine via the intelligent terminal, the communication module is not powered off, the washing machine is still in the Internet-connected standby state, and thus the intelligent terminal can control the washing machine in real time.

However, the operating frequency of a general household washing machine is relatively low, i.e., two to three times per week; if the washing machine is always in the Internet-connected standby state to achieve real-time remote control of the washing machine, a huge waste of energy is caused certainly, and a potential safety hazard that the washing machine catches fire is also increased; and if the communication module of the washing machine needs to be powered off by unplugging the electric plug manually, the remote control also has limitations, and the user experience is poor.

Therefore, the present disclosure is provided.

SUMMARY

The technical problem to be solved by the present disclosure is to overcome disadvantages of the prior art, an Internet of Things washing machine control method is provided, in which when a washing machine is started up, a communication module is connected with the Internet, a user operates on an intelligent terminal or the washing machine for running a washing program; The washing machine is shut down in time when meeting a shutdown condition, the washing machine is prevented from being on standby for a long time, a potential safety hazard that the washing machine catches fire is eliminated, and the purposes of saving electric energy, improving security of the washing machine and meanwhile enhancing user experience are achieved.

Another object of the present disclosure is to provide an Internet of Things washing machine control system using the method.

The other object of the present disclosure is to provide a washing machine using the method.

The technical schemes adopted by the present disclosure for solving the technical problem are as follows:

The disclosure provides an Internet of Things washing machine control method comprising:

S1, when a power module of a washing machine detects a startup signal, starting up the washing machine, and enabling a communication module to start to connect with the Internet;

S2, judging whether the communication module is successfully connected with the Internet or not; if yes, activating a remote control function and entering the next step; and if no, directly entering the next step;

S3, judging whether the washing machine receives an operating command of running a clothes washing program or not; if yes, executing the operating command and entering the next step; and if no, directly entering the next step;

S4, judging whether to shut down the washing machine or not, if yes, entering the next step, and if no, returning to the step S3; and S5, sending a shutdown signal to the power module, shutting down the washing machine, and powering off the communication module.

Furthermore, in the step S4, if the time during which the washing machine does not receive the operating command of running the clothes washing program reaches a preset time, shutting down the machine, and entering the step S5.

Furthermore, in the step S1, after the communication module is started up to connect with the Internet, enabling a first timer to start timing, and enabling the machine to be on standby and wait for the operating command; and if the failure of connection to the Internet is detected in the step S2, entering the step S3, if the condition that the washing machine does not receive the operating command of running the clothes washing program is detected, entering the step S4, and when the current time of the first timer reaches a first preset time, shutting machine the machine and entering the step S5.

Furthermore, in the step S2, after the communication module is successfully connected with the Internet, and the remote control function is activated, enabling a second timer to start timing, enabling the machine to be on standby and wait for the operating command, and entering the step S3; and in the step S3, if the washing machine does not receive the operating command of running the clothes washing program, entering the step S4, and when the current time of the second timer reaches a second preset time, shutting down the machine and entering the step S5.

Furthermore, after the second timer is started up, the method also comprises:

when an operating command of changing the second preset time sent by an intelligent terminal is received, updating the value of the second preset time to be a set value sent by the intelligent terminal, resetting the current time of the second timer to zero, and starting up the second timer again; and when an operating command of canceling the clothes washing program sent by the intelligent terminal is received, resetting the time of the current second timer to zero, and starting up the second timer again.

Furthermore, the intelligent terminal also executes one or a combination of the operations from when an APP on the intelligent terminal is started up, displaying a prompt of safety verification in a display interface of the intelligent terminal; and when the connection to the Internet succeeds, displaying a prompt about allowing the change of the second preset time in the display interface of the intelligent terminal; and when the current time of the second timer is less than the second preset time, and no user operation is detected, displaying a prompt about whether to shut down the machine or not in the display interface of the intelligent terminal; and when the operation that a user shuts down the machine is detected, displaying a prompt about whether to shut down the machine or not in the display interface of the intelligent terminal; and when the intelligent terminal is disconnected with the washing machine, displaying a prompt of conditions needed by remote control in the display interface of the intelligent terminal.

Furthermore, in the step S3, when the washing machine receives the operating command of running the clothes washing program, running the clothes washing program, and after clothes are washed, enabling a third timer to start timing, enabling the machine to be on standby and wait for the operating command, and entering the step S4; judging whether to shut down the machine or not, and if the machine is not shut down and the clothes washing program needs to be run continuously, returning to the step S3, repeating the steps above, until the washing machine does not receive the operating command of running the clothes washing program, and when the current time of the third timer reaches a third preset time, shutting down the machine and entering the step S5.

Furthermore, after running the clothes washing program, the method also comprises:

when the operation command of canceling clothes washing sent by the intelligent terminal is received, stopping the current clothes washing program, and returning to the step S3.

Furthermore, in the step S4, when the condition that the user executes the shutdown operation on the washing machine or the intelligent terminal is detected, shutting down the machine.

The disclosure also provides a control system using the Internet of Things washing machine control method, the control system comprises a washing machine, an intelligent terminal and a server, wherein the washing machine performs data interaction with the intelligent terminal via the server.

The disclosure also provides a washing machine using the Internet of Things washing machine control method. The washing machine comprises:

a communication module connecting the washing machine and an intelligent terminal;

a computer board control module used for receiving an operation command sent by the machine or the intelligent terminal and executing the operation command, automatically judging whether the washing machine is shut down or not, and automatically shutting down the washing machine when the washing machine meets a shutdown condition; and a power module used for starting up the washing machine and meanwhile powering on the communication module, and shutting down the washing machine and meanwhile powering off the communication module.

The technical schemes provided by the specific embodiments of the present disclosure have the beneficial effects:

the communication module is connected with the Internet when the washing machine is started up, the user operates on the intelligent terminal or the washing machine to run the washing program, and the washing machine is shut down in time when the shutdown condition is met, so that the washing machine is prevented from being on standby for a long time, the potential safety hazard that the washing machine catches fire is eliminated, the electric energy is saved, the security of the washing machine is improved, and meanwhile the user experience is enhanced.

BRIEF DESCRIPTION OF THE DRAWINGS

In order to describe the technical schemes in the specific embodiments of the present disclosure more clearly, a simple introduction on the drawings which are needed in the specific embodiments is given below. Apparently, the drawings described below are merely some of the embodiments of the present disclosure, based on which other drawings may be obtained by those of ordinary skill in the art without any creative effort.

DETAILED DESCRIPTION

Figure 1:
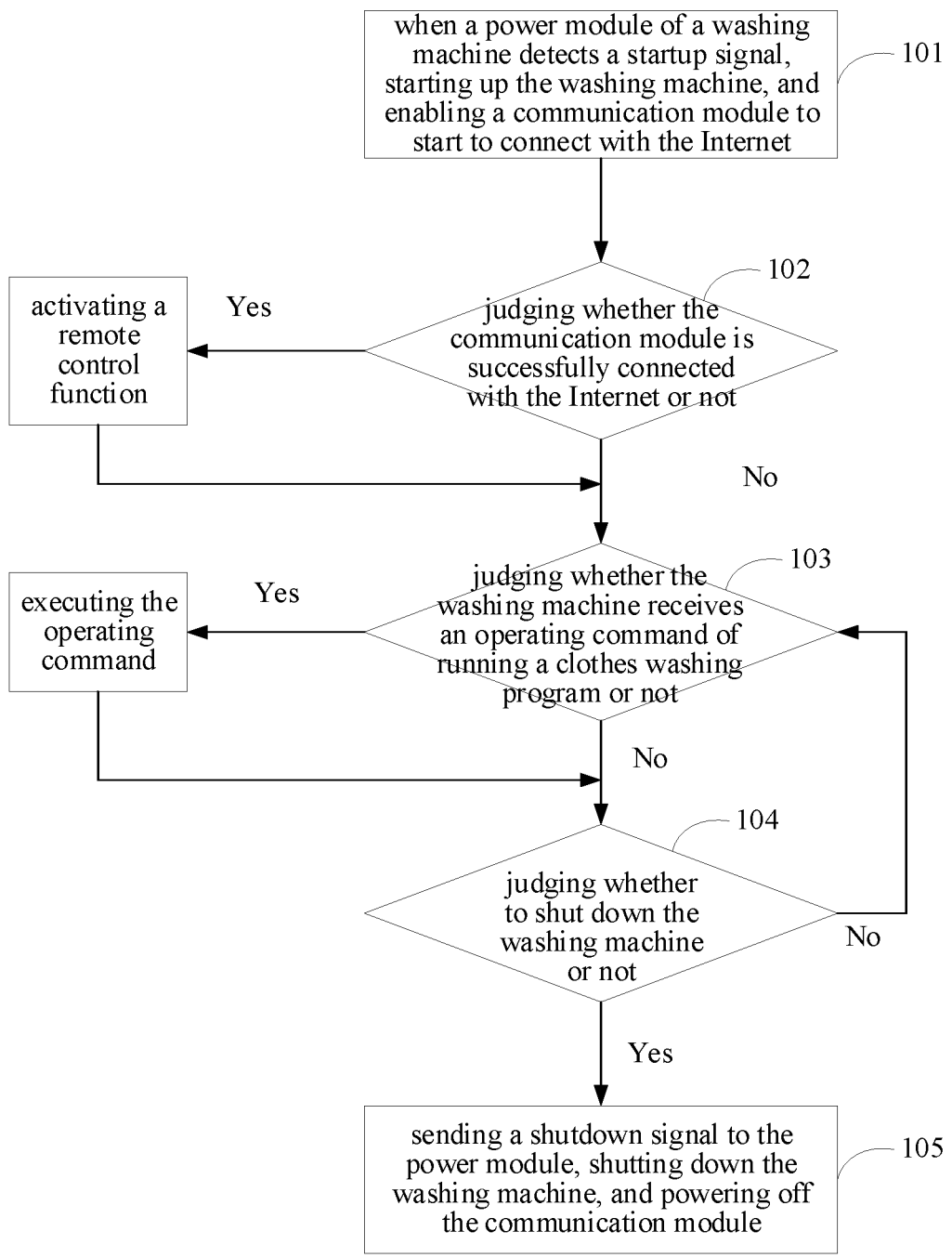
FIG. 1 is a method flow chart of an Internet of Things washing machine control method provided by the present disclosure.

In the present disclosure, a washing machine is connected with an intelligent terminal via a communication module, wherein the communication module can be a WIFI/Zigbee/RS-485/GPRS, the intelligent terminal can be an intelligent mobile phone/PAD/PC, and remote control on the washing machine can be achieved after an APP capable of controlling the washing machine is installed on the intelligent terminal and the intelligent terminal is connected with the washing machine. As shown in FIG. 1, the control method provided by the present disclosure comprises:

Step 101, when a power module of the washing machine detects a startup signal, starting up the washing machine, and enabling the communication module to start to connect with the Internet.

Specifically, after a user connects an electric plug of the washing machine with a power supply, the washing machine is not started up at the moment, and the communication module is not powered on; when the washing machine detects a startup signal of the power module after the user presses down a startup key on the washing machine, the washing machine is started up and meanwhile sends an Internet connection control command to the communication module, the communication module is enabled to start to connect with the Internet.

Furthermore, if the communication module is connected with the Internet for the first time, a name and a password of a home router also need to be input to connect the communication module with the home router, and after connection succeeds, the name and the password of the router are stored; if the Internet connection of communication module is not the first time, the stored name and password of the router are directly acquired, and the router is automatically connected.

Step 102, judging whether the communication module is successfully connected with the Internet or not;

if yes, activating a remote control function and entering the step 103, and if no, directly entering the step 103.

Wherein when the communication module is successfully connected with the Internet, the remote control function is activated, so that the user can directly control the washing machine on itself and can also remotely control the washing machine on the intelligent terminal; when the connection of the communication module to the Internet fails, the user only can control the washing machine on itself.

Step 103, judging whether the washing machine receives an operating command of running a clothes washing program or not, if yes, executing the operating command and entering the step 104, and if no, directly entering the step 104.

Wherein when the user selects a washing program on the washing machine or the intelligent terminal, after receiving the operating command, the washing machine directly executes the operating command. When the user does not select a washing program, the washing machine is in a standby state, waits for receiving the operating command and meanwhile judges whether the current condition of the washing machine meets a shutdown condition or not, so that compared with the existing washing machine which is always in the standby state when there is no user operation, the washing machine is more intelligent and higher in security.

Step 104, judging whether to shut down the washing machine or not, if yes, entering the next step, and if no, returning to the step 103, preferably, when the shutdown operation executed by the user on the washing machine or the intelligent terminal is detected, shutting down the machine, and entering the step 105.

Specifically, when the user presses down a shutdown key on the washing machine or click a shutdown key on the intelligent terminal, directly executing a shutdown operation command by the washing machine, and entering the step 105.

Further preferably, if the time during which the washing machine does not receive the operating command of running the clothes washing program reaches a preset time, shutting down the machine, and entering the step 105.

In the following, description is provided according to different scenarios:

The first scenario: when the connection of the washing machine to the Internet fails.

Specifically, in the step S1, after the communication module is started up to connect with the Internet, a first timer is enabled to start timing, the machine becomes standby and waits for the operating command; and if the washing machine receives the operating command of running the washing program at the moment, the operating command is directly executed.

If the failure of connection to the Internet is detected in the step S2, the step S3 is entered; if the condition that the washing machine does not receive the operating command of running the clothes washing program is detected, the step S4 is entered. When the current time of the first timer reaches the first preset time, it indicates that the user has left or temporarily changes an idea and does not want to wash clothes; if the wash machine is still in the standby state at the moment, the power is wasted and the potential safety hazard of catching fire is caused; and in order to save the electric energy and improve security, the washing machine needs to be shut down, and the step S5 is entered.

Preferably, when the washing machine does not receive the operating command of running the clothes washing program, but receives the other operating commands (such as the operating command of setting washing time, the operating command of setting the number of washing times and the operating command of setting water level), the current time of the first timer is reset to zero, the first timer is started up again, and the operation of returning to the step 103 is performed.

The second scenario: when the washing machine is successfully connected with the Internet.

Specifically, in the step S2, after the communication module is successfully connected with the Internet and the remote control function is activated, the second timer is enabled to start timing, the machine becomes standby and waits for the operating command, the step S3 is entered, and if the washing machine receives the operating command of running the washing program at the moment, the operating command is directly executed.

In the step S3, if the washing machine does not receive the operation command of running the clothes washing program, the step S4 is entered; when the current time of the second timer reaches the second preset time, it indicates that the user has left or temporarily changes the idea and does not want to wash clothes; if the wash machine is still in the standby state at the moment, the power is wasted and the potential safety hazard of catching fire is caused; and in order to save the electric energy and improve security, the washing machine needs to be shut down, and the step S5 is entered.

Preferably, when the washing machine does not receive the operating command of running the clothes washing program, but receives the other operating commands (such as the operating command of setting the washing time, the operating command of setting the number of washing times and the operating command of setting the water level), the current time of the second timer is reset to zero, the second timer is started up again, and the operation of returning to the step 103 is performed.

Further preferably, if the washing machine receives the operating command of changing the second preset time sent by the intelligent terminal, the value of the second preset time is updated to be a set value sent by the intelligent terminal, the current time of the second timer is reset to zero, the second timer is started up again, and the operation of returning to the step 103 is performed.

The third scenario: when the washing machine runs the clothes washing program.

Specifically, when the washing machine receives the operating command of running the clothes washing program in the step S3, the clothes washing program is run, and after clothes washing ends, the third timer is enabled to start timing, the machine becomes standby and waits for the operating command, and the step S4 is entered. Whether the machine is shut down or not is judged, if the machine is not shut down and the clothes washing program needs to be run continuously, the operation of returning to the step S3 is performed; the steps above are repeated, until the washing machine does not receive the operating command of running the clothes washing program. The current time of the third timer reaches the third preset time, it indicates that the user has completed clothes washing and does not need to wash the other clothes, or the user has left; and in order to save electric energy and improve security, the washing machine needs to be shut down, and the step S5 is entered.

Preferably, after the washing machine runs the clothes washing program, if the operating command of canceling clothes washing sent by the intelligent terminal is received, the current clothes washing program is stopped, and the operation of returning to the step 103 is performed.

Step 105, sending a shutdown signal to the power module, shutting down the washing machine, and powering off the communication module.

Wherein, after the communication module is powered off, the Internet of Things function of the washing machine is not available, the intelligent terminal can no longer control the washing machine remotely, the communication module is powered on again only after the user starts up the washing machine manually, and after the connection to the Internet succeeds, the intelligent terminal can control the washing machine remotely again.

Preferably, in the embodiment, the intelligent terminal also executes the following operations of (1) When the APP on the intelligent terminal is started up, displaying a prompt of safety verification in a display interface of the intelligent terminal, for prompting the user to ensure safety of a clothes washing environment when the user controls the washing machine remotely, so as to improve safety of remote control.

(2) When the connection to the Internet succeeds, displaying a prompt about allowing the change of the second preset time in the display interface of the intelligent terminal, thus allowing the user to reset the value of the second preset time on a standby setting page.

For example, the default value of the second preset time is 1 hour, after the connection to the Internet succeeds, a prompting message of "start up now, be on standby at any time within one hour and allow prolonging the standby time by setting on the standby setting page" is displayed in the display interface of the intelligent terminal, and after entering the standby setting page, the user can select existing preset options of "on standby 4 hours" and "on standby 8 hours", and can also set the other time duration freely.

(3) When the current time of the second timer is less than the second preset time and no user operation is detected, displaying a prompt about whether to shut down the machine or not in the display interface of the intelligent terminal. Furthermore, when the current time of the second timer is T minutes away from the second preset time, and the user still has no operation, popping up the corresponding prompt in the display interface of the intelligent terminal and providing operation options of "continuously on standby n hours" and "shut down immediately", wherein n is the value of the second preset time. If the user clicks the option of "shut down immediately", sending the shutdown command to the washing machine; if the user selects the option of "continuously on standby n hours", resetting the count of the second timer to zero and starting up the second timer again, and when the current time of the second timer is T minutes away from the second preset time, popping up the corresponding prompt once more and providing the operation options of "continuously on standby n hours" and "shut down immediately".

(4) When shutdown operation executed by the user is detected, a prompt about whether to confirm shutdown or not is displayed in the display interface of the intelligent terminal and the corresponding operation options are provided. For example, when the user clicks shutdown on the intelligent terminal, a prompt about "whether to confirm shutdown or not and the washing machine can only be started up via operation on itself after shutdown" is popped up in the display interface, and two options of "confirm shutdown" and "cancel shutdown" are provided, wherein if the user clicks the option of "confirm shutdown", the intelligent terminal sends the shutdown command to the washing machine, and if the user clicks the option of "cancel shutdown", the intelligent terminal does not send the shutdown command to the washing machine.

(5) When the intelligent terminal is disconnected with the washing machine, a prompt of conditions needed by remote control is displayed in the display interface of the intelligent terminal.

Specifically, after sending the shutdown command to the washing machine, the intelligent terminal is disconnected with the washing machine, and a prompt of the conditions needed by remote control is displayed in the display interface of the intelligent terminal. For example, after the intelligent terminal is disconnected with the washing machine, a prompt that "the washing machine can only be remotely controlled after the washing machine is started up via operation on itself" is popped up in the display interface.

In the abovementioned embodiment, the communication module is connected with the Internet when the washing machine is started up, the user operates on the intelligent terminal or the washing machine to run the washing program, and the washing machine is shut down in time when the shutdown condition is met, so that the washing machine is prevented from being on standby for a long time, the potential safety hazard that the washing machine catches fire is eliminated, the electric energy is saved, the security of the washing machine is improved, and meanwhile the user experience is enhanced.

Hereinafter, detailed description of the mode of execution will be further described with reference to the accompanying drawings and specific embodiments.

Embodiment 1

Figure 2:
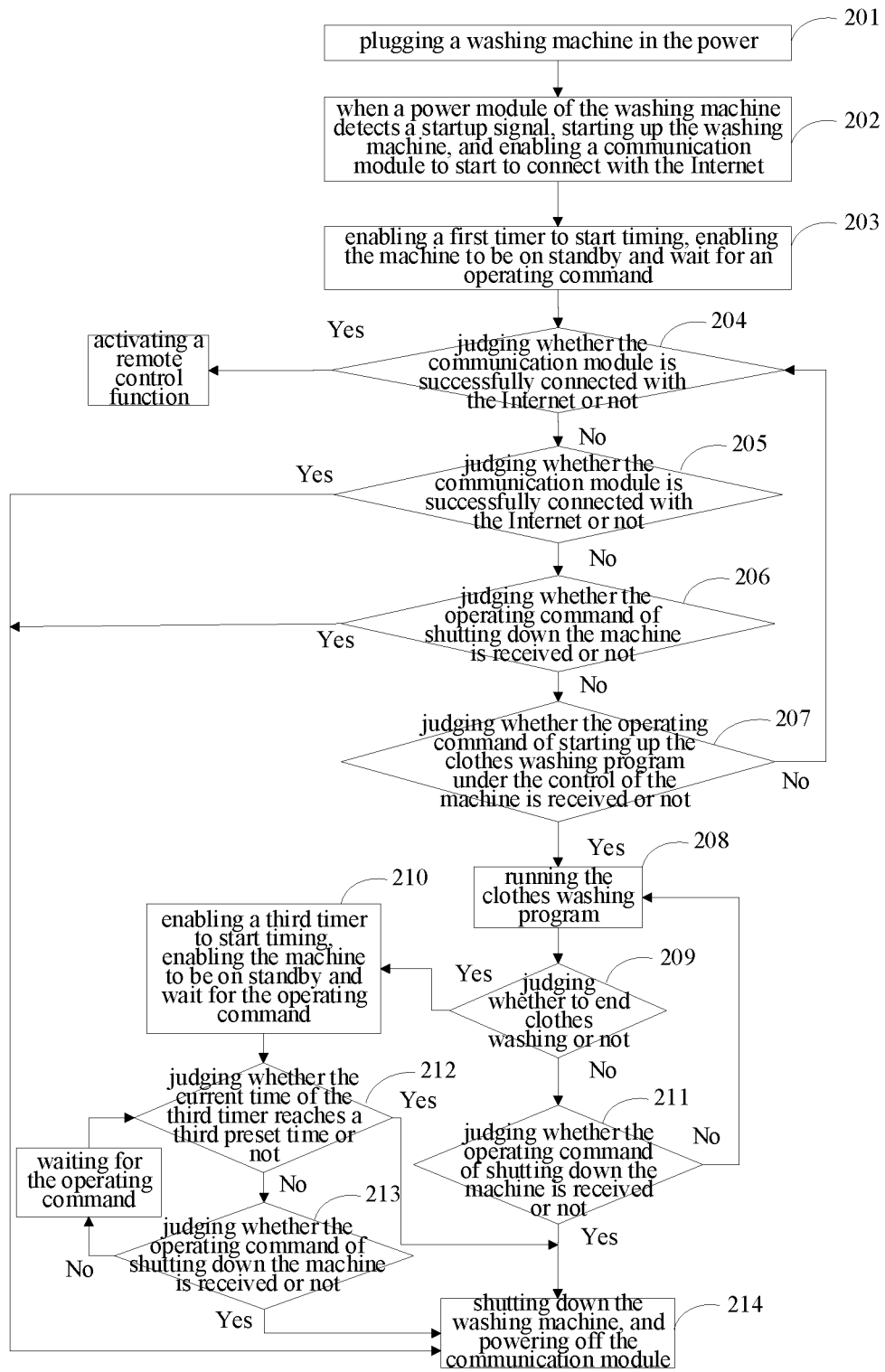
FIG. 2 is a method flow chart of another Internet of Things washing machine control method provided by the present disclosure.

As shown in FIG. 2, the disclosure provides an Internet of Things washing machine control method of which an execution body is a washing machine, the method comprising:

Step 201, the washing machine plugging in the power.

Specifically, an electrical plug of the washing machine is connected with a power supply by a user, the washing machine is not started up at the moment and a communication module is not powered on.

Step 202, when a power module of the washing machine detects a startup signal, starting up the washing machine, and enabling the communication module to start to connect with the Internet.

Specifically, after the user presses down a startup key on the washing machine, the washing machine detects a startup signal of a power module, the washing machine is started up and meanwhile sends an Internet connection control command to the communication module, and the communication module is powered on and starts to connect with the Internet.

Step 203, enabling a first timer to start timing, enabling the machine to be on standby and wait for an operating command.

Specifically, the first timer is enabled to start timing, and if the operating command of running a clothes washing program is received at the moment, the operating command is directly executed and the operation of skipping to the step 208 is performed.

Step 204, judging whether the communication module is successfully connected with the Internet or not;

if yes, activating a remote function which allows the user to control the washing machine on itself or on an intelligent terminal; and if no, executing the step 205.

Step 205, judging whether the current time of the first timer reaches a first preset time or not;

if yes, skipping to the step 214; and if no, executing the step 206.

Wherein, the value of the first preset time is preset in the washing machine by a developer, or a user actively sets the value of the first preset time on the washing machine manually before the clothes are washing.

Specifically, when the washing machine does not receive the operating command of running the clothes washing program, and the current time of the first timer reaches the first preset time, the washing machine meets a shutdown condition and sends a shutdown signal to the power module, the power module is automatically powered off for shutdown, and the communication module is powered off.

Furthermore, after the first timer is started up, if the user performs other operations (such as setting washing time, setting the number of washing times and setting water level) on the machine within the first preset time, the washing machine resets the time of the first timer to zero after directly executing the operating command of the user, and the first timer is started up again, and the operation of returning to the step 203 is performed to continuously wait for the operating command.

Step 206, judging whether the operating command of shutting down the machine is received or not;

if yes, skipping to the step 214; and if no, executing the step 207.

Specifically, when the user directly presses down the shutdown key on the washing machine, the washing machine sends the shutdown signal to the power module, the power module is automatically powered off for shutdown, and the communication module is powered off.

Step 207, judging whether the operating command of starting up the clothes washing program under the control of the machine is received or not;

if yes, executing the step 208; and if no, returning to the step 204.

Specifically, when the user selects the clothes washing program on the washing machine, the washing machine directly runs the clothes washing program; and if the user does not have any operation, the user operation is continuously waited and the operation of returning to the step 204 is performed.

Preferably, in the embodiment, the sequence of the steps 205, 206 and 207 is only one mode of implementation, and the sequence of the steps 205, 206 and 207 can also be randomly changed in actual application.

Step 208, running the clothes washing program.

Step 209, judging whether to end clothes washing or not;

if yes, executing the step 210; and if no, executing the step 211.

Step 210, enabling a third timer to start timing, enabling the machine to be on standby and wait for the operating command.

Specifically, after clothes washing ends directly enabling the third timer to start timing, and if the operating command of running the clothes washing program once more is received at the moment, directly executing the operating command and skipping to the step 208.

Step 211, judging whether the operating command of shutting down the machine is received or not;

if yes, skipping to the step 214; and if no, returning to the step 208 to continuously wash the clothes.

Specifically, when the user directly presses down the shutdown key on the washing machine, the washing machine sends the shutdown signal to the power module, the power module is automatically powered off for shutdown, and the communication module is powered off.

Step 212, judging whether the current time of the third timer reaches a third preset time or not;

if yes, skipping to the step 214; and if no, executing the step 213.

Wherein, the value of the third preset time is preset in the washing machine by a developer, or the user actively sets the value of the third preset time on the washing machine manually before the clothes are washing.

Specifically, after the clothes washing ends, when the user does not have any operation and the time reaches the third preset time, the washing machine sends the shutdown signal to the power module, the power module is automatically powered off for shutdown, and the communication module is powered off.

Furthermore, if the user executes the operation on the machine within the third preset time, the washing machine directly executes the operating command of the user.

Step 213, judging whether the operating command of shutting down the machine is received or not;

if yes, skipping to the step 214; and if no, waiting for the operating command and returning to the step 212.

Specifically, when the user directly presses down the shutdown key on the washing machine, the washing machine sends the shutdown signal to the power module, the power module is automatically powered off for shutdown, and the communication module is powered off.

Preferably, in the embodiment, the sequence of the steps 212 and 213 is only one mode of implementation, and the sequence of the steps 212 and 213 can also be randomly changed in actual application.

Step 214, shutting down the washing machine, and powering off the communication module.

Specifically, after received the shutdown signal the power module is automatically powered off for shutdown, and the communication module is powered off.

Wherein, in the embodiment, after being powered off, the communication module can no longer be automatically connected with the Internet; only after the user presses down the startup key on the washing machine, the washing machine is started up, and the communication module can be enabled to connect with the Internet.

In the embodiment, when the washing machine is started up, the communication module is connected with the Internet; when the connection to the Internet is failed, the user operates on the washing machine to run the washing program. Whether the washing machine meets the shutdown condition or not is judged during each phase of the washing machine, and the washing machine is shut down in time when the shutdown condition is met, so that the washing machine is prevented from being on standby for a long time, a potential safety hazard that the washing machine catches fire is eliminated, the electric energy is saved, the security of the washing machine is improved and meanwhile the user experience is enhanced.

Embodiment 2

Figure 3:
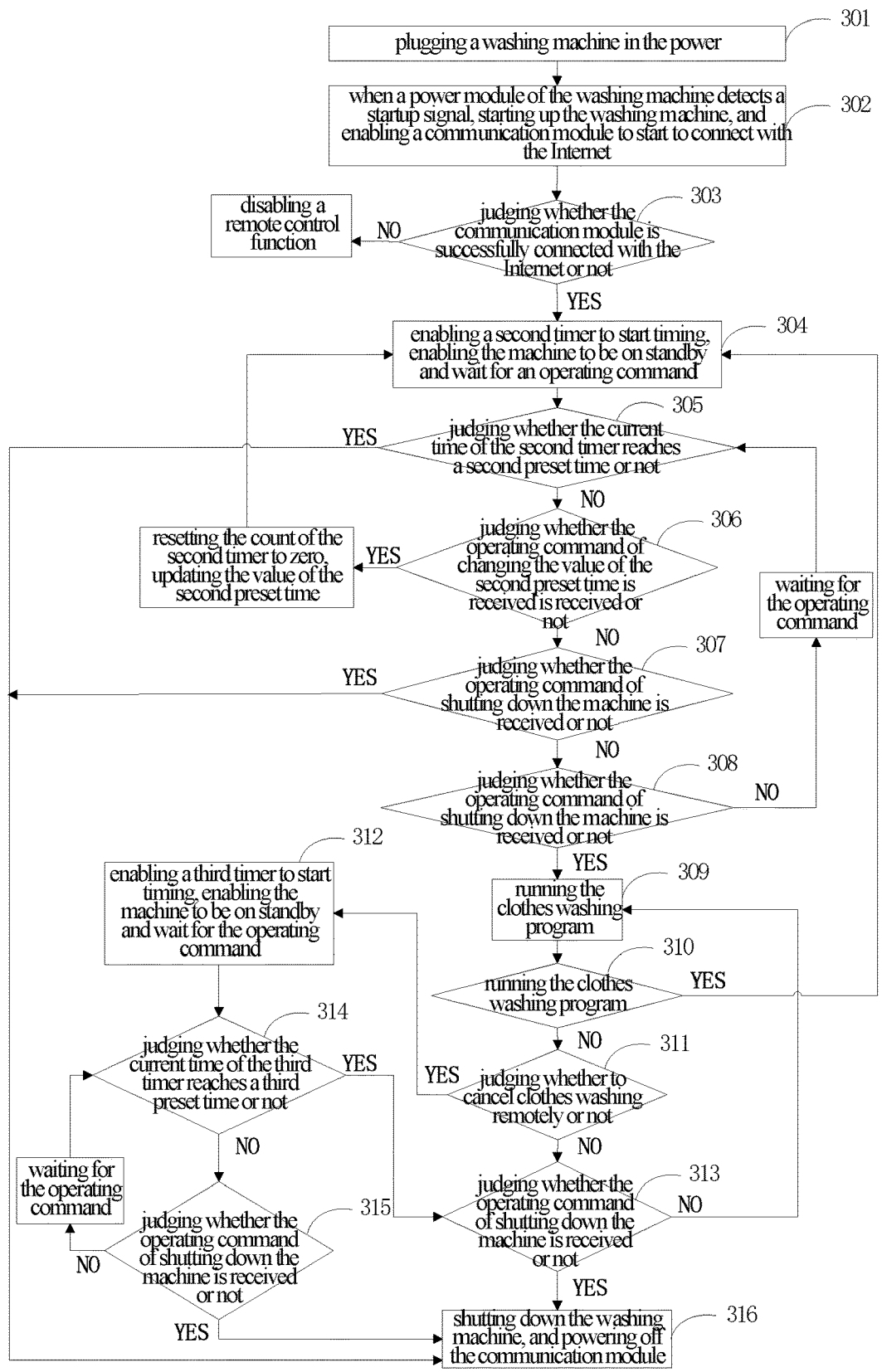
FIG. 3 is a method flow chart of still another Internet of Things washing machine control method provided by the present disclosure.

As shown in FIG. 3, the disclosure provides an Internet of Things washing machine control method of which an execution body is a washing machine, the method comprising:

Step 301, the washing machine plugging in the power.

Wherein the specific execution process and description in the step are the same as these in the step 201, which are not described in details herein.

Step 302, when a power module of the washing machine detects a startup signal, starting up the washing machine, and enabling a communication module to start to connect with the Internet.

Wherein the specific execution process and description in the step are the same as these in the step 202, which are not described in details herein.

Step 303, judging whether the communication module is successfully connected with the Internet or not;

if yes, executing the step 304; and if no, disabling the remote function, thus allowing the user to control the washing machine on itself.

Step 304, enabling a second timer to start timing, enabling the machine to be on standby and wait for the operating command.

Specifically, enabling the second timer to start timing, and if the operating command of running a clothes washing program is received, directly executing the operating command and skipping to the step 309.

Step 305, judging whether the current time of the second timer reaches a second preset time or not;

if yes, skipping to the step 316; and if no, executing the step 306.

Wherein the value of the second preset time is preset in the washing machine by a developer, or the user actively sets the value of the second preset time on the washing machine or the intelligent terminal manually before the clothes are washing.

Specifically, when the washing machine does not receive the operating command of running the clothes washing program, and the current time of the second timer reaches the second preset time, the washing machine meets a shutdown condition and sends a shutdown signal to the power module, the power module is automatically powered off for shutdown, and the communication module is powered off.

Step 306, judging whether the command of changing the value of the second preset time is received or not;

if yes, resetting the count of the second timer to zero, updating the value of the second preset time, and returning to the step 304; and if no, executing the step 307.

Preferably, after the connection to the Internet succeeds, displaying a prompt about allowing the change of the second preset time in the display interface of the intelligent terminal, thus allowing the user to reset the value of the second preset time on a standby setting page.

Furthermore, after the second timer is started up, if the user performs other operations (such as setting washing time, setting the number of washing times and setting water level) on the machine within the second preset time, allowing the washing machine to directly execute the operating command of the user to modify corresponding parameters to reset the time of the second timer to zero, starting up the second timer again, and returning to step 304 to continuously wait for the operating command.

Step 307, judging whether the operating command of shutting down the machine is received or not;

if yes, skipping to the step 316; and if no, executing the step 308.

Specifically comprising that when the user directly presses down the shutdown key on the washing machine or executes the shutdown operation on the intelligent terminal, the washing machine sends the shutdown signal to the power module, the power module is automatically powered off for shutdown, and the communication module is powered off.

Step 308, judging whether the operating command of starting the clothes washing program from the machine or the intelligent terminal is received or not;

if yes, executing the step 309; and if no, waiting for the operating command and returning to the step 305.

Specifically, when the user selects the clothes washing program on the washing machine or on the intelligent terminal, the washing machine directly runs the clothes washing program; and if the user does not have any operation, and the operation of continuously waiting for the user operation and returning to the step 305 is performed.

Preferably, in the embodiment, the sequence of the steps 305, 306, 307 and 308 is only one mode of implementation, and the sequence of the steps 305, 306, 307 and 308 can also be randomly changed in actual application.

Step 309, running the clothes washing program.

Step 310, judging whether to cancel clothes washing remotely or not;

if yes, returning to the step 304; if no, executing the step 311.

Preferably, when the intelligent terminal performs remote control, allowing ending the clothes washing program by selecting the option of canceling clothes washing under the state of not shutting down the machine, returning to the step 304 to reset the time of the second timer to zero, starting up the second timer once more, and continuously waiting for the operating command of the user.

Step 311, judging whether to end clothes washing or not;

if yes, executing the step 312; and if no, executing the step 313.

Step 312, enabling a third timer to start timing, enabling the machine to be on standby and wait for the operating command.

Specifically, after clothes washing ends directly enabling the third timer to start timing, and if the operating command of running the clothes washing program once more is received at the moment, directly executing the operating command and skipping to the step 309.

Step 313, judging whether the operating command of shutting down the machine is received or not;

if yes, skipping to the step 316; and if no, returning to the step 309 to continuously wash the clothes.

Specifically, when the user directly presses down the shutdown key on the washing machine or executes the shutdown operation on the intelligent terminal, the washing machine sends the shutdown signal to the power module, the power module is automatically powered off for shutdown, and the communication module is powered off.

Step 314, judging whether the current time of the third timer reaches a third preset time or not;

if yes, skipping to the step 316; and if no, executing the step 315.

Wherein the value of the third preset time is preset in the washing machine by a developer, or the user actively sets the value of the third preset time on the washing machine or the intelligent terminal manually before the clothes are washing.

Specifically, after the clothes washing ends and when the user does not have any operation and the time reaches the third preset time, the washing machine sends the shutdown signal to the power module, the power module is automatically powered off for shutdown, and the communication module is powered off.

Furthermore, if the user executes the operation on the machine or on the intelligent terminal within the third preset time, the washing machine directly executes the operating command of the user.

Step 315, judging whether the operating command of shutting down the machine is received or not;

if yes, skipping to the step 316; and if no, waiting for the operating command and returning to the step 314.

Specifically, when the user directly presses down the shutdown key on the washing machine or executes the shutdown operation on the intelligent terminal, the washing machine sends the shutdown signal to the power module, the power module is automatically powered off for shutdown, and the communication module is powered off.

Preferably, in the embodiment, the sequence of the steps 314 and 315 is only one mode of implementation, and the sequence of the steps 314 and 315 can also be randomly changed in actual application.

Step 316, shutting down the washing machine, and powering off the communication module.

Specifically, after received the shutdown signal the power module is automatically powered off for shutdown, and the communication module is powered off.

Wherein, in the embodiment, after being powered off, the communication module can no longer be automatically connected with the Internet; only after the user presses down the startup key on the washing machine, the washing machine is started up, and the communication module can be enabled to connect with the Internet.

In the embodiment, when the washing machine is started up, the communication module is connected with the Internet; when the connection to the Internet succeeds, the user operates on the washing machine or on the intelligent terminal to run the washing program. Whether the washing machine meets the shutdown condition or not is judged during each phase of the washing machine, and the washing machine is shut down in time when meeting the shutdown condition, so that the washing machine is prevented from being on standby for a long time, a potential safety hazard that the washing machine catches fire is eliminated, the electric energy is saved, the security of the washing machine is improved and meanwhile the user experience is enhanced.

Embodiment 3

Figure 4:
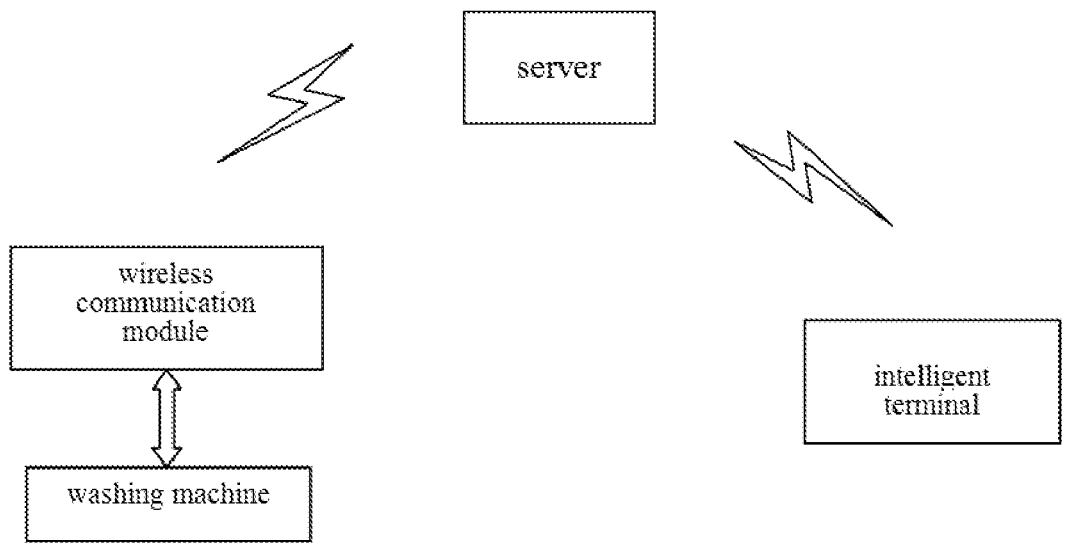
FIG. 4 is a structural schematic diagram of an Internet of Things washing machine control system provided by the present disclosure.

As shown in FIG. 4, the embodiment provides an Internet of Things washing machine control system comprising a washing machine, an intelligent terminal and a server, wherein the washing machine performs data interaction with the intelligent terminal via the server.

Specifically, the washing machine is in communication connection with the server; the intelligent terminal is also in communication connection with the server. The server is used for providing a washing machine management platform service including register and management of a user account, and binding and management of the washing machine and the user account, and the server is also used for sending control commands to the washing machine and receiving information reported by the washing machine.

A user can install an APP client on the intelligent terminal (such as an intelligent mobile phone, a PAD or a PC), and register an account and bind the account with the washing machine. After the connection to the washing machine succeeds, the user can check the running state of the washing machine in real time and control the washing machine remotely on the intelligent terminal. The remote control mainly comprises remotely setting each washing parameter of the washing machine, remotely controlling the washing machine to run a clothes washing program or remotely controlling the washing machine to shut down. After the washing machine is shut down, the intelligent terminal can no longer start up the washing machine remotely, and the washing machine can be connected again to be controlled remotely only after the washing machine is started up on itself. Therefore, when the user does not use the washing machine for a long time, shutdown of a power module and a communication module of the washing machine can be ensured, the washing machine is prevented from being on standby for a long time, the potential safety hazard that the washing machine catches fire is eliminated, and thus the electric energy is saved, and the security of the washing machine is improved.

Embodiment 4

Figure 5:
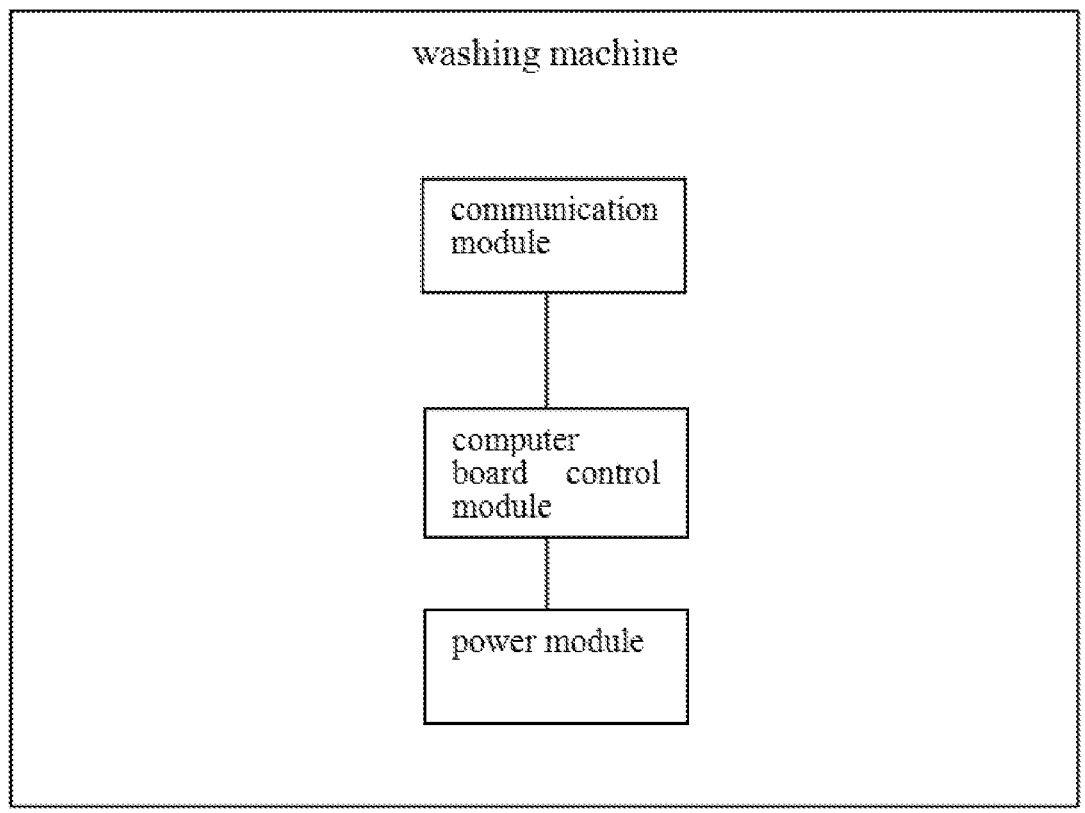
FIG. 5 is a structural schematic diagram of a washing machine provided by the present disclosure.

As shown in FIG. 5, the embodiment provides a washing machine comprising a communication module, a computer board control module and a power module. The communication module can adopt wireless communication technologies, such as WIFI, Zigbee, RS-485 and GPRS, and the connection between the washing machine and an intelligent terminal is built via the communication module. The computer board control module receives an operating command sent by the washing machine or the intelligent terminal and executes the operating command, and automatically judges whether the washing machine executes the shutdown operation or not, and the washing machine is automatically shut down when meeting a shutdown condition. The power module starts up or shuts down the washing machine, and the communication module is powered on when the washing machine is started up; and the communication module is powered off when the washing machine is shut down.

In the embodiment, when the washing machine is started up, the communication module is connected with the Internet, whether the washing machine executes the shutdown operation or not is automatically judged by the computer board control module; the washing machine is shut down in time when meeting the shutdown condition and meanwhile the communication module is shut down, so that the washing machine is prevented from being on standby for a long time, the potential safety hazard that the washing machine catches fire is eliminated, the electric energy is saved, the security of the washing machine is improved and meanwhile the user experience is enhanced.

The above descriptions are only the preferred embodiments of the present disclosure without limiting the form of the present disclosure; the preferred embodiments of the present disclosure are disclosed as above, but are not intended to limit the present disclosure; those skilled familiar to the patent can make other equivalents and modifications within the spirit and scope of the present disclosure by using the above-mentioned technical content, and any simple modification and variation made to the above embodiments according to the technical essence of the present disclosure without departing from the spirit and scope of the disclosure are still within the scope of the present disclosure.

The invention claimed is:

1. An Internet of Things control method of a washing machine, wherein the Internet of Things control method comprises:

S1, when a power module of a washing machine detects a startup signal, starting up the washing machine, and enabling a communication module to start to connect with the Internet;

S2, judging whether the communication module is successfully connected with the Internet or not; if yes, activating a remote control function and entering S3; and if no, directly entering S3;

S3, judging whether the washing machine receives an operating command of running a clothes washing program or not; if yes, executing the operating command and entering S4; and if no, directly entering S4;

S4, judging whether to shut down the washing machine or not, if yes, entering S5; and if no, returning to S3; and S5, sending a shutdown signal to the power module, shutting down the washing machine, and powering off the communication module.

2. The Internet of Things control method of the washing machine according to claim 1, wherein, if a time during which the washing machine does not receive the operating command of running the clothes washing program reaches a preset time in S4, shutting down the machine, and entering S5.

3. The Internet of Things control method of the washing machine according to claim 1, wherein, after the communication module is enabled to start to connect with the Internet in S1, enabling a first timer to start timing, and enabling the washing machine to be on standby and wait for an operating command; and if a failure of connection to the Internet is detected in S2, entering S3, if a condition that the washing machine does not receive the operating command of running the clothes washing program is detected, entering S4, and when a current time of the first timer reaches a first preset time, shutting down the washing machine and entering S5.

4. The Internet of Things control method of the washing machine according to claim 1, wherein, after the communication module is successfully connected with the Internet and the remote control function is activated in S2, enabling a second timer to start timing, enabling the machine to be on standby and wait for the operating command, and entering S3; and if the washing machine does not receive the operating command of running the clothes washing program in S3, entering S4, and when a current time of the second timer reaches a second preset time, shutting down the washing machine and entering S5.

5. The Internet of Things control method of the washing machine according to claim 4, further comprises: after the second timer is started up, when an operating command of changing the second preset time sent by an intelligent terminal is received, updating a value of the second preset time to be a set value sent by the intelligent terminal, resetting a current time of the second timer to zero, and starting up the second timer again; and when an operating command of canceling the clothes washing program sent by the intelligent terminal is received, resetting a time of the current second timer to zero, and starting up the second timer again.

6. The Internet of Things control method of the washing machine according to claim 5, wherein the intelligent terminal also executes one or a combination of operations as follows:

when an APP on the intelligent terminal is started up, displaying a prompt of safety verification on a display interface of the intelligent terminal;

when a connection to the Internet succeeds, displaying a prompt about allowing a change of the second preset time on the display interface of the intelligent terminal; and when the current time of the second timer is less than the second preset time, and no user operation is detected, displaying a prompt about whether to shut down the washing machine or not on the display interface of the intelligent terminal;

when an operation that a user shuts down the washing machine is detected, displaying a prompt about whether to shut down the washing machine or not on the display interface of the intelligent terminal; and when the intelligent terminal is disconnected with the washing machine, displaying a prompt of conditions needed by remote control on the display interface of the intelligent terminal.

7. The Internet of Things control method of the washing machine according to claim 1, wherein, when the washing machine receives the operating command of running the clothes washing program in S3, running the clothes washing program, and after clothes are washed, enabling a third timer to start timing, enabling the washing machine to be on standby and wait for the operating command, and entering S4;

judging whether to shut down the washing machine or not, and if the washing machine is not shut down and the clothes washing program needs to be run continuously, returning to S3, repeating S3 and S4, until the washing machine does not receive the operating command of running the clothes washing program, and when the current time of the third timer reaches a third preset time, shutting down the machine and entering S5.

8. The Internet of Things control method of the washing machine according to claim 7, further comprises:

after the clothes washing program is running, when an operation command of canceling clothes washing sent by the intelligent terminal is received, stopping a current clothes washing program, and returning to S3.

9. The Internet of Things control method of the washing machine according to claim 1, wherein, in S4, if a shutdown operation executed by a user on the washing machine or an intelligent terminal is detected, shutting down the washing machine.

10. A control system implementing the Internet of Things control method of the washing machine according to claim 1, wherein the control system comprises the washing machine, an intelligent terminal, and a server; and the washing machine performs data interaction with the intelligent terminal via the server.

11. A washing machine implementing the control method according to claim 1, wherein the washing machine comprises:

a communication module connecting the washing machine and an intelligent terminal;

a computer board control module used for receiving an operation command sent by the washing machine or the intelligent terminal and executing the operation command, automatically judging whether the washing machine is shut down or not, and automatically shutting down the washing machine when the washing machine meets a shutdown condition; and a power module used for starting up the washing machine and meanwhile powering on the communication module, and shutting down the washing machine and meanwhile powering off the communication module.

12. The Internet of Things control method of the washing machine according to claim 2, wherein, after the communication module is enabled to start to connect with the Internet in S1, enabling a first timer to start timing, and enabling the washing machine to be on standby and wait for an operating command; and if a failure of connection to the Internet is detected in S2, entering S3, if a condition that the washing machine does not receive the operating command of running the clothes washing program is detected, entering S4, and when a current time of the first timer reaches a first preset time, shutting machine the machine and entering S5.

13. The Internet of Things control method of the washing machine according to claim 2, wherein, after the communication module is successfully connected with the Internet and the remote control function is activated in S2, enabling a second timer to start timing, enabling the washing machine to be on standby and wait for the operating command, and entering S3; and if the washing machine does not receive the operating command of running the clothes washing program in S3, entering S4, and when a current time of the second timer reaches a second preset time, shutting down the machine and entering S5.

14. The Internet of Things control method of the washing machine according to claim 2, wherein, when the washing machine receives the operating command of running the clothes washing program in S3, running the clothes washing program, and after clothes are washed, enabling a third timer to start timing, enabling the washing machine to be on standby and wait for the operating command, and entering S4;

judging whether to shut down the washing machine or not, and if the washing machine is not shut down and the clothes washing program needs to be run continuously, returning to S3, repeating S3 and S4, until the washing machine does not receive the operating command of running the clothes washing program, and when the current time of the third timer reaches a third preset time, shutting down the machine and entering S5.

* * * * *